United States Patent (10) Patent No.: US 7,031,724 B2
Ross et al. (45) Date of Patent: Apr. 18, 2006

(54) LOCATION-BASED SERVICES FOR A TELEMATICS SERVICE SUBSCRIBER

(75) Inventors: Steven J. Ross, Burlingame, CA (US); Jane F. Macfarlane, Oakland, CA (US); Julie A. Rybicki, Burlingame, CA (US)

(73) Assignee: General Motors Corporation, Detroit, MI (US)

( * ) Notice: Subject to any disclaimer, the term of this patent is extended or adjusted under 35 U.S.C. 154(b) by 391 days.

(21) Appl. No.: 10/387,069

(22) Filed: Mar. 12, 2003

(65) Prior Publication Data

US 2004/0203919 A1    Oct. 14, 2004

(51) Int. Cl.
*H04Q 7/20* (2006.01)

(52) U.S. Cl. .............................. 455/456.1; 455/414.1; 455/456.2

(58) Field of Classification Search ........... 379/201.07, 379/201.08, 201.09; 455/404.2, 414.2, 414.3, 455/433, 456.1, 457, 414.1; 701/117, 200, 701/201, 202
See application file for complete search history.

(56) References Cited

U.S. PATENT DOCUMENTS

| | | | | |
|---|---|---|---|---|
| 4,954,958 A | * | 9/1990 | Savage et al. | 701/202 |
| 5,109,399 A | * | 4/1992 | Thompson | 379/201.08 |
| 5,479,482 A | * | 12/1995 | Grimes | 455/556.1 |
| 5,625,668 A | * | 4/1997 | Loomis et al. | 455/456.5 |
| 5,812,959 A | * | 9/1998 | Froeburg et al. | 701/117 |
| 5,946,687 A | | 8/1999 | Gehani et al. | |
| 6,021,371 A | * | 2/2000 | Fultz | 701/200 |
| 6,185,290 B1 | * | 2/2001 | Shaffer et al. | 379/220.01 |
| 6,199,010 B1 | | 3/2001 | Richton | |
| 6,209,026 B1 | | 3/2001 | Ran et al. | |
| 6,459,782 B1 | * | 10/2002 | Bedrosian et al. | 379/201.08 |
| 6,674,849 B1 | * | 1/2004 | Froeberg | 379/201.06 |

* cited by examiner

*Primary Examiner*—Bing Q. Bui
(74) *Attorney, Agent, or Firm*—Cardinal Law Group

(57) ABSTRACT

The present invention includes a method and system for providing location-based services to a telematics service subscriber. A message notice is sent to the telematics service subscriber and a request for messages is received. A determination is made as to whether at least one message includes a location information attachment, and then at least one telematics service is provided based on the determination. Another aspect of the invention is a computer usable medium used to provide the location-based services.

20 Claims, 6 Drawing Sheets

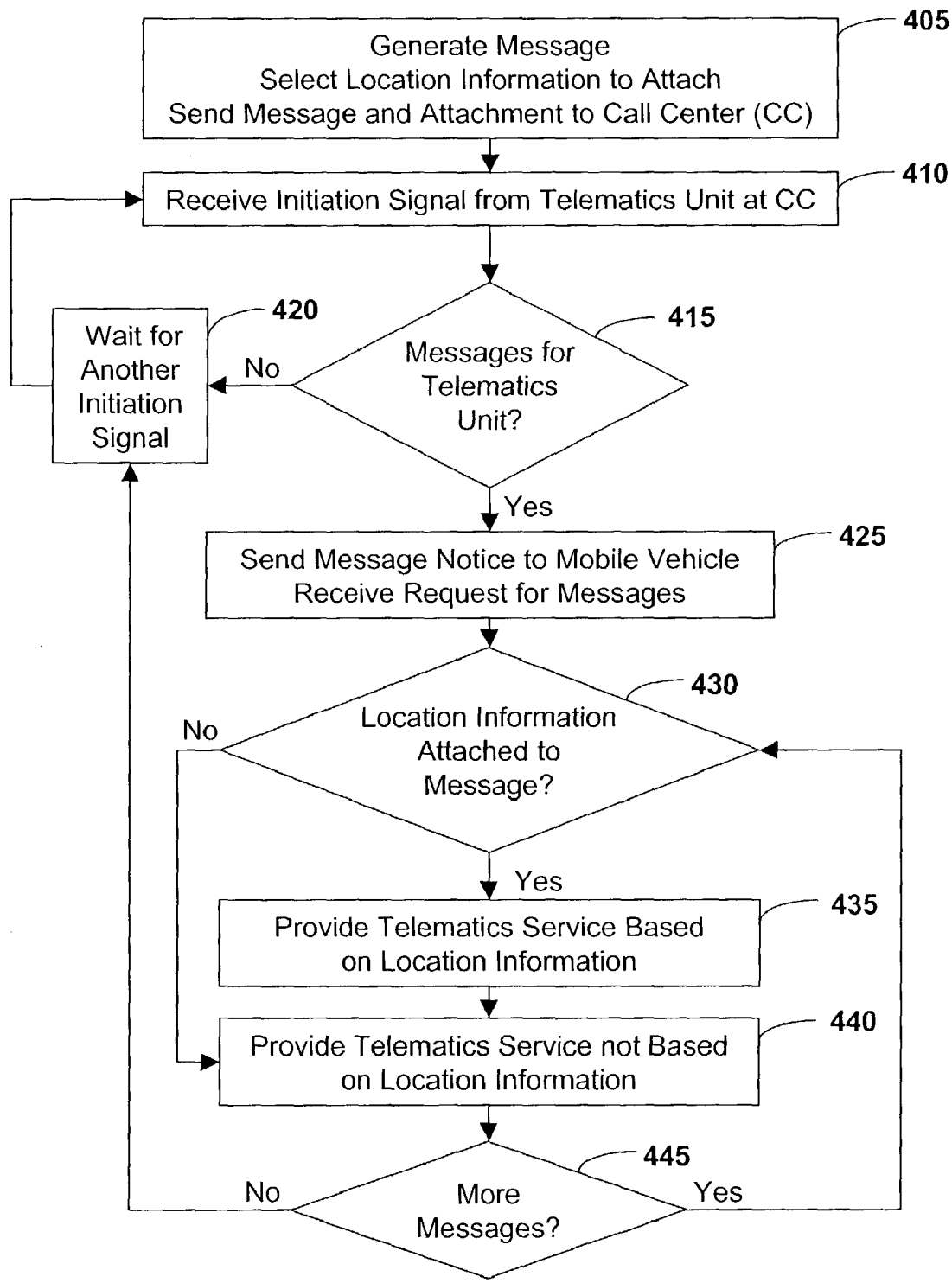

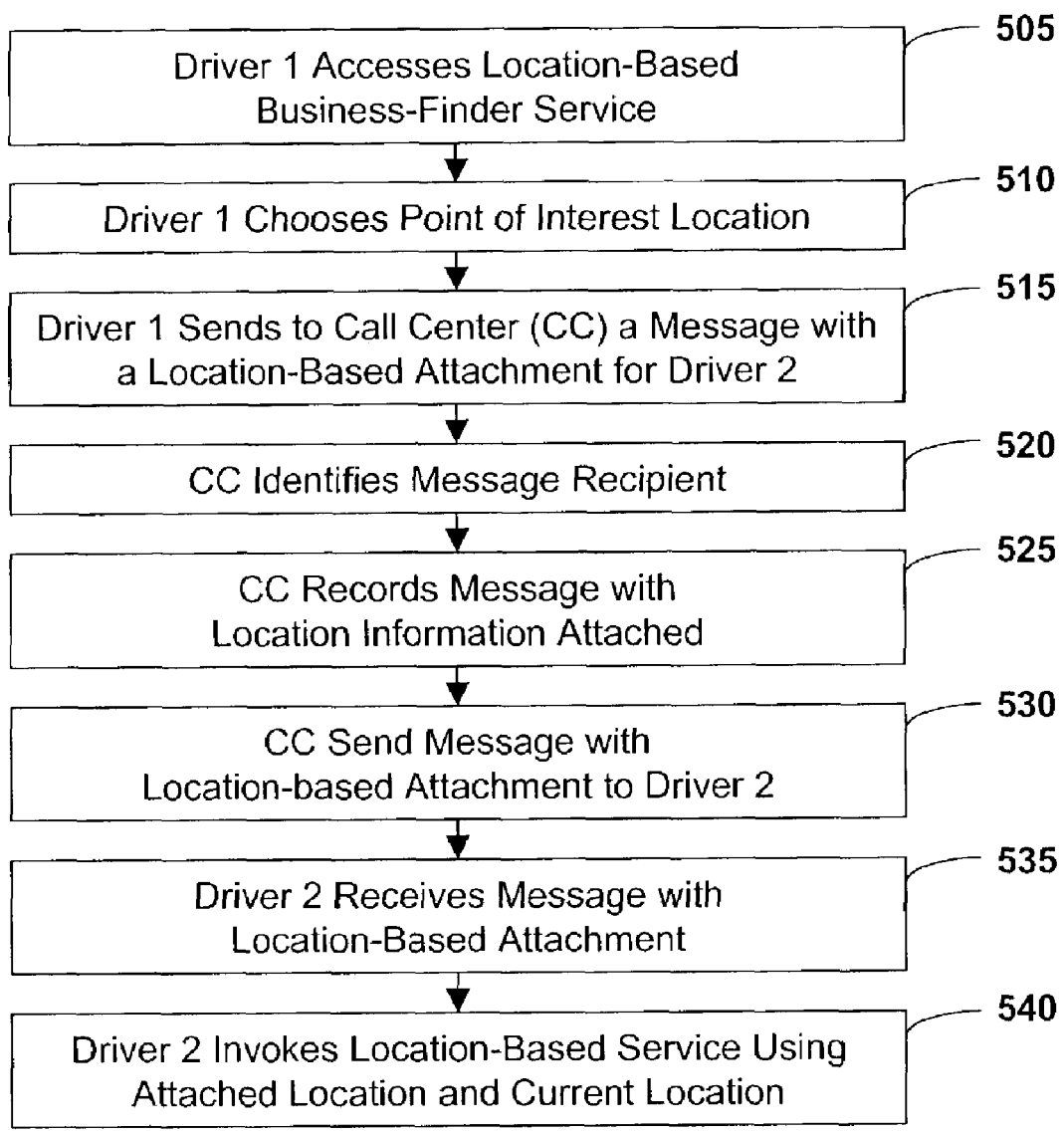

600

650

LOCATION-BASED SERVICES FOR A TELEMATICS SERVICE SUBSCRIBER

FIELD OF THE INVENTION

This invention relates generally to wireless communications with a mobile vehicle. More specifically, the invention relates to a system and method for providing location-based services to a mobile vehicle, a telematics service subscriber, and wireless communication devices.

BACKGROUND OF THE INVENTION

The opportunity to personalize features in a mobile vehicle is ever increasing as the automobile is being transformed into a communications and entertainment platform as well as a transportation platform. Projections are that by 2006 a majority of new American cars will be installed with some type of telematics unit to provide wireless communication and location-based services. These services may be accessed through interfaces such as voice-recognition computer applications, touch-screen computer displays, computer keyboards, or a series of buttons on the dashboard or console of a vehicle.

Currently, telematics service call centers, in-vehicle compact disk (CD) or digital video display (DVD) media, web portals, and voice-enabled phone portals provide various types of location services, including driving directions, stolen vehicle tracking, traffic information, weather reports, restaurant guides, ski reports, road condition information, accident updates, street routing, landmark guides, and business finders.

For example, traffic and driving directions may be accessed through a voice portal that uses incoming number identification to generate location information based on the area code or prefix of the phone number, or to access location information stored in a user's profile associated with the phone number. Users may be prompted to enter more details through a voice interface. Other examples are web and wireless portals that offer location-based services such as maps and driving directions where the user enters both a start and end addresses. Some of these services may have a voice interface.

The location-based services described above and current telematics services available in vehicles do not provide a way by which location information can be relayed to a telematics service subscriber so that the subscriber may automatically receive driving directions from the current location of a vehicle to the location indicated by location information sent with a message or content item sent by a call center.

Drivers would benefit from a system and method that can provide location services based on the current position of the vehicle and the location data related to a message sent from Internet-enabled devices, or related to content items such as news stories accessed from a telematics service provider. One telematics service subscriber would be able to communicate with another telematics service subscriber about a specific location of interest and have the system provide the second subscriber with not only an address, but also the directions to that address from the vehicle's current location. A person who needs to give directions to a driver would benefit from being able to send messages to one or more telematics service subscribers with location information for an event such as a meeting, and when the messages are received, the telematics service could provide driving directions to that specific location from the current position of each driver without additional input. Additionally, such a method might invoke services based on locations associated with personal information from computerized calendars or contacts lists, resulting in greater convenience, productivity, and synchronization with other computer tools.

It is an object of this invention, therefore, to provide a system and method for location-based services to a telematics service subscriber, such that location information can be shared with and be made available to other drivers, users of telematics services, electronic calendars and personal organizers, while overcoming the challenges and obstacles described above.

SUMMARY OF THE INVENTION

The present invention includes a method and a system for providing location-based services to a telematics service subscriber. A message notice is sent to the telematics service subscriber and a request for messages is received. A determination is made as to whether at least one message includes a location information attachment, and at least one telematics service may be provided based on the determination. Another aspect of the invention is a computer usable medium used to provide the location-based services.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 4 is a flow diagram of one embodiment of a method for providing location-based services to a mobile vehicle, in accordance with the current invention;

FIG. 5 is a flow diagram of one embodiment of a method for providing location-based services between two mobile vehicles, in accordance with the current invention.

DETAILED DESCRIPTION OF THE PRESENTLY PREFERRED EMBODIMENTS

With the present invention, a telematics service subscriber accesses specialized location information attached to an electronic message. A telematics service subscriber may be an in-vehicle telematics unit that receives subscribed services from a call center. Alternatively, the subscriber may refer to other equipment such as a wireless communication device, a personal digital assistant (PDA) or even a personal computer that receives telematics services. Additionally, the telematics service subscriber may refer to the person using the abovementioned equipment.

The electronic message may be made available to the telematics service subscriber from another mobile vehicle, personal computer, phone or wireless device such as a PDA. The attachment of the message contains location information, such as longitudinal and latitudinal points, that allows the telematics unit of the mobile vehicle or another device of a telematics service subscriber, along with a telematics call center, to provide driving directions and other pertinent services related to that specified location. The automatic invocation of location-based services using location information that is sent to a telematics service subscriber reduces the need to re-enter location information. Telematics service users can share location information among themselves by sending messages or forwarding content items. A telematics service call center may be used to transmit the messages and to provide any desired telematics services. The messages may contain location information when they are sent to the call center and/or the call center can attach location information.

Figure 1:
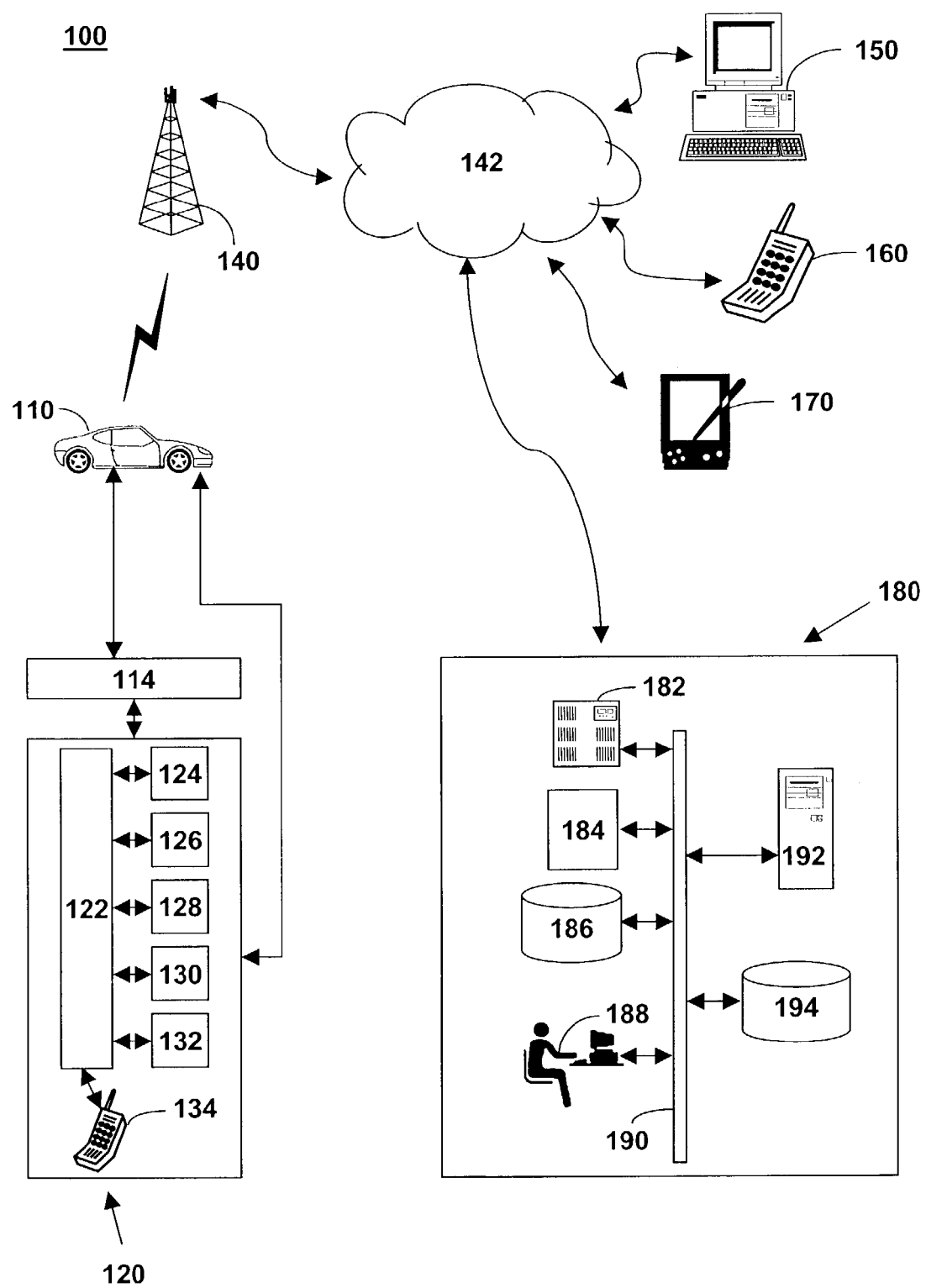
FIG. 1 illustrates one embodiment of a system for providing location-based services to a mobile vehicle, in accordance with the current invention.

FIG. 1 illustrates one embodiment of system for providing location-based services to a mobile vehicle, in accordance with the present invention at 100.

Location-based information system 100 includes a mobile vehicle 110, a vehicle communication bus 114, a telematics unit 120, one or more wireless carrier systems 140, one or more communication networks 142, and one or more telematics services call centers 180. Location-based information system 100 may also include one or more client, personal or user computers 150, one or more cellular phones 160, and one or more handheld devices 170 such as a personal digital assistant. Mobile vehicle 110, which includes vehicle communication bus 114 and telematics unit 120, is equipped with suitable hardware and software for transmitting and receiving voice and data communications.

Telematics unit 120 may include a digital signal processor (DSP) 122 connected to a wireless modem 124, a global positioning system (GPS) unit 126, an in-vehicle memory 128, a microphone 130, one or more speakers 132, and an embedded or in-vehicle mobile phone 134. DSP 122 may also be referred to as a microcontroller, controller, host processor, or vehicle communications processor. GPS unit 126 may provide longitude and latitude coordinates of the vehicle. In-vehicle mobile phone 134 may be an analog, digital, dual-mode, dual-band, multi-mode or multi-band cellular phone.

DSP 122 may control communications between telematics unit 120 and call center 180. DSP 122 may manage the receiving and sending of messages in mobile vehicle 110. DSP 122 may execute various computer programs that control programming and operational modes of electronic and mechanical systems within mobile vehicle 110. A voice-recognition application may be installed in DSP 122 that can translate human voice input through microphone 130 to digital signals. DSP 122 may generate and accept digital signals transmitted between telematics unit 120 and vehicle communication bus 114 that is connected to various electronic modules in the vehicle. These digital signals may activate the programming mode and operation modes, as well as provide for data transfers. Signals from DSP 122 may be translated into voice messages and sent out through speaker 132.

Mobile vehicle 110 via telematics unit 120 may send and receive radio transmissions from wireless carrier system 140. Wireless carrier system 140 may be any suitable system for transmitting a signal from mobile vehicle 110 to communication network 142.

Communication network 142 includes services from mobile telephone switching offices, wireless networks, public-switched telephone networks, and Internet protocol (IP) networks. Communication network 142 may be comprised of a wired network, an optical network, a fiber network, another wireless network, or any combination thereof. Communication network 142 connects to mobile vehicle 110 via wireless carrier system 140. Communication network 142 may connect wireless carrier system 140 to user computer 150, cellular phone 160, handheld device 170, and call center 180.

Client, personal or user computer 150 includes a computer usable medium that executes Internet browser and Internet-access computer programs to send and receive data over communication network 142 to call center 180. User computer 150 sends a message with attached location information through a web-page interface using communication standards such as hypertext transport protocol (HTTP) and transport-control protocol and Internet protocol (TCP/IP).

As an alternative to user computer 150, cellular phone 160 or handheld device 170 may include a computer usable medium that contains program code to send data such as a message with attached location information to call center 180 by using Internet communication standards or other suitable standards.

Call center 180 is a location where many calls may be received and serviced at the same time, or where many calls may be sent at the same time. The call center may be a telematics call center, prescribing communications to and from telematics unit 120. The call center may be a voice call center, providing verbal communications between an advisor in the call center and a subscriber in a mobile vehicle. The call center may provide each of these functions.

Call center 180 may contain one or more voice and data switches 182, one or more communication services managers 184, one or more communication services databases 186, one or more communication services advisors 188, one or more bus systems 190, one or more application servers 192, and one or more databases 194.

Switch 182 of call center 180 connects to communication network 142. Switch 182 transmits voice or data transmissions from call center 180, and receives voice or data transmissions from telematics unit 120 in mobile vehicle 110 through wireless carrier system 140 and communication network 142. Switch 182 receives data transmissions from and sends data transmissions to user computer 150, cellular phone 160, and handheld device 170. Switch 182 receives data transmissions from or sends data transmissions to one or more communication services managers 184 via one or more bus systems 190.

Communication services manager 184 is any suitable hardware and software capable of providing requested communication services to telematics unit 120 in mobile vehicle 110. Communication services manager 184 sends to or receives from one or more communication services databases 186 data transmissions via bus system 190. Communication services manager 184 sends to or receives from one or more communication services advisors 188 data transmissions via bus system 190. Communication services database 186 sends to or receives from communication services advisor 188 data transmissions via bus system 190. Communication services advisor 188 receives from or sends to switch 182 voice or data transmissions.

Communication services manager 184 may provide one or more of a variety of services, including location-based services, enrollment services, navigation assistance, directory assistance, roadside assistance, business or residential assistance, information services assistance, emergency assistance, and communications assistance. Communication services manager 184 transmits messages with location information and other data to telematics unit 120 in mobile vehicle 110 through wireless carrier system 140, communication network 142, voice and data switch 182, and bus system 190. Communication services manager 184 stores or retrieves data and information from communication services database 186. Communication services manager 184 may provide requested information to communication services advisor 188.

Communication services advisor 188 may be a real advisor or a virtual advisor. A real advisor is a human being in verbal communication with a user or subscriber in mobile vehicle 110 via telematics unit 120. A virtual advisor may be a synthesized voice interface responding to requests from telematics unit 120 in mobile vehicle 110.

Communication services advisor 188 provides services to telematics unit 120 in mobile vehicle 110. Services provided by communication services advisor 188 may include location-based services, enrollment services, navigation assistance, real-time traffic advisories, directory assistance, roadside assistance, business or residential assistance, information services assistance, emergency assistance, and communications assistance. Communication services advisor 188 may communicate with telematics unit 120 in mobile vehicle 110 through wireless carrier system 140 and communication network 142, using voice transmissions, or through communication services manager 184 and switch 182 using data transmissions. Switch 182 selects between voice transmissions and data transmissions.

Application server 192 in call center 180 receives messages with attached location data from user computer 150, cellular phone 160 or handheld device 170 via communication network 142. Location data may also originate from and be attached at call center 180 when an additional location application software determines that location information might be appropriately attached to items such as an event with a specific location recorded in a personal calendar application of a telematics service subscriber.

In alternative embodiments, user computer 150 may have a wireless modem to send data through a wireless carrier system 140, which connects to communication network 142. Data is received by switch 182 and sent to one or more application servers 192 at call center 180. Application server 192 may be any suitable hardware and software capable of providing web services to help transmit messages from user computer 150 to telematics unit 120 in mobile vehicle 110. Application server 192 may send to or receive from one or more databases 194 data transmissions via bus system 190. Application server 192 includes computer applications and files for managing and storing messages sent to mobile vehicle 110. It also may manage and store preferences for wireless vehicle communication, networking, maintenance and diagnostic services for a mobile vehicle.

One or more application servers 192 may be networked via bus system 190 to distribute user-preference data among its network components such as database 194, which, in alternative embodiments may be a part of communication service database 186. The configuration of network components may vary without changing the functionality of call center 180 of the present invention.

Communication services manager 184 receives from application server 192 messages with attached location information, as well as service-preference requests for a variety of services from the user via user computer 150, cellular phone 160, and handheld device 170. When application server 192 receives a message for mobile vehicle 110, it signals communication service manager 184, which in turn, communicates to telematics unit 120 that messages are waiting to be retrieved. An alert that a message is waiting may be sent automatically to telematics unit 120, or alternatively, call center 180 may wait until it receives a call from a telematics service subscriber before indicating that any messages are waiting. A driver, by a voice or digital-signal command to telematics unit 120, may send a request for messages to be downloaded via an instructional signal or a voice call. In another embodiment of the present invention, messages may be accessed directly from the server using any suitable telematics device without downloading them to the vehicle. The request is sent through wireless modem 124, wireless carrier system 140, and communication network 142 to call center 180.

Figure 2:
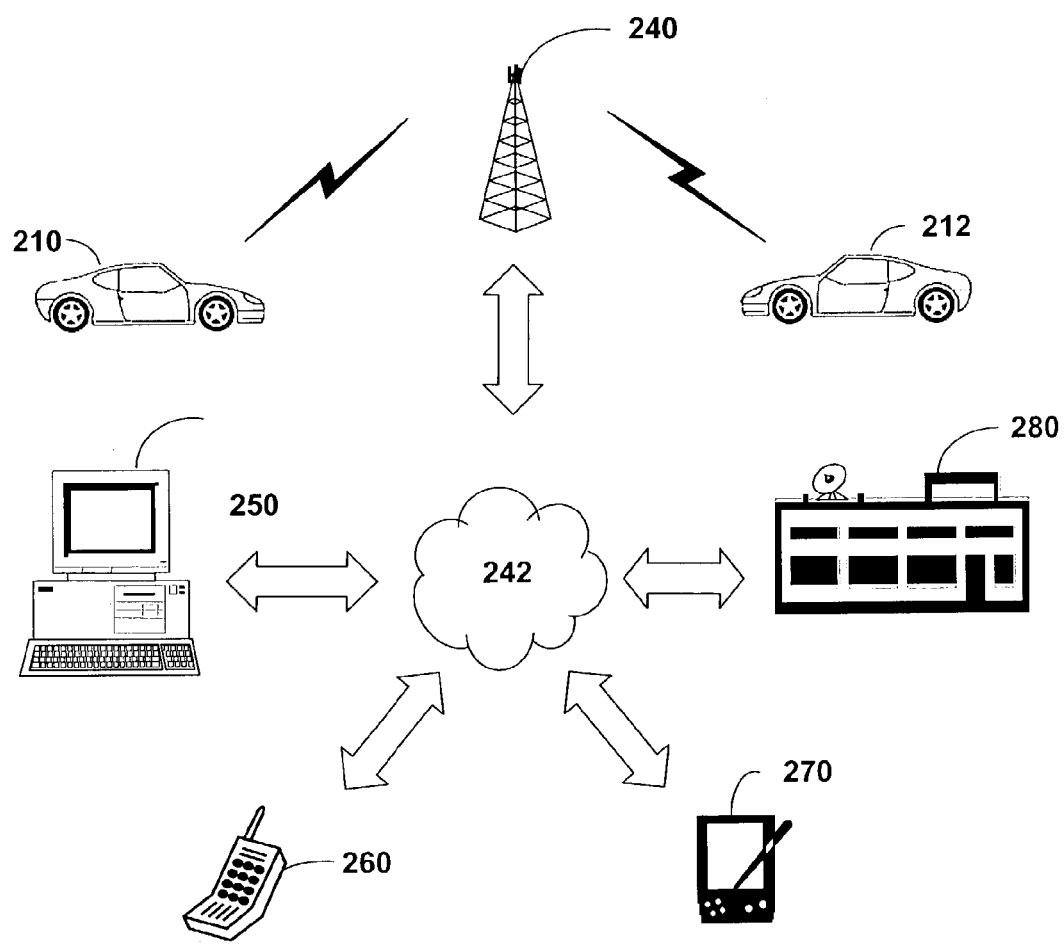
FIG. 2 illustrates another embodiment of a system for providing location-based services to a mobile vehicle, in accordance with the current invention.

FIG. 2 illustrates another embodiment of a system for providing location-based services to a mobile vehicle, in accordance with the current invention. Location-based service system 200 outlines the path of a message that is transmitted to a mobile vehicle 212 from another mobile vehicle 210, a user computer 250, a cellular phone 260, or a handheld device 270 via a communication network 242, call center 280, and wireless carrier system 240.

A driver in mobile vehicle 210 may send a message with a location-based attachment to mobile vehicle 212 via wireless carrier system 240, communication network 242, and call center 280. Alternatively, when away from the vehicle, the driver or another telematics service user may send a message with a location-based attachment to one or both mobile vehicles 210 and 212 through an Internet-enabled user computer 250 and communication network 242 to call center 280. The message may be processed and sent back through communication network 242 and wireless carrier system 240 to either or both mobile vehicles 210 and 212.

With cellular phone 260, a telematics service user may send a message to one or both mobile vehicles 210 and 212 via communication network 242 and call center 280. The voice recognition software translates voice communication into recognized utterances that can be used by a Voice Extensible Markup Language (Voice-XML) gateway, or other similar software. By using voice-recognition software, cellular phone 260 or call center 280 may translate voice communication from cellular phone 260 into data communication schema. The driver or telematics service user may also use Internet-enabled handheld device 270, such as a personal digital assistant, to construct a message using voice or keypad input and send the message in a similar path to a mobile vehicle 210 or mobile vehicle 212.

In one embodiment of the present invention, the message is stored at call center 280 until it receives a request from mobile vehicle 210 or mobile vehicle 212 for message downloading. Alternatively, call center 280 may send messages automatically to the telematics units of mobile vehicle 210 and 212 where the messages can be stored. The telematics unit may indicate to the driver that messages are waiting and may be retrieved at the request of the driver.

Figure 3:
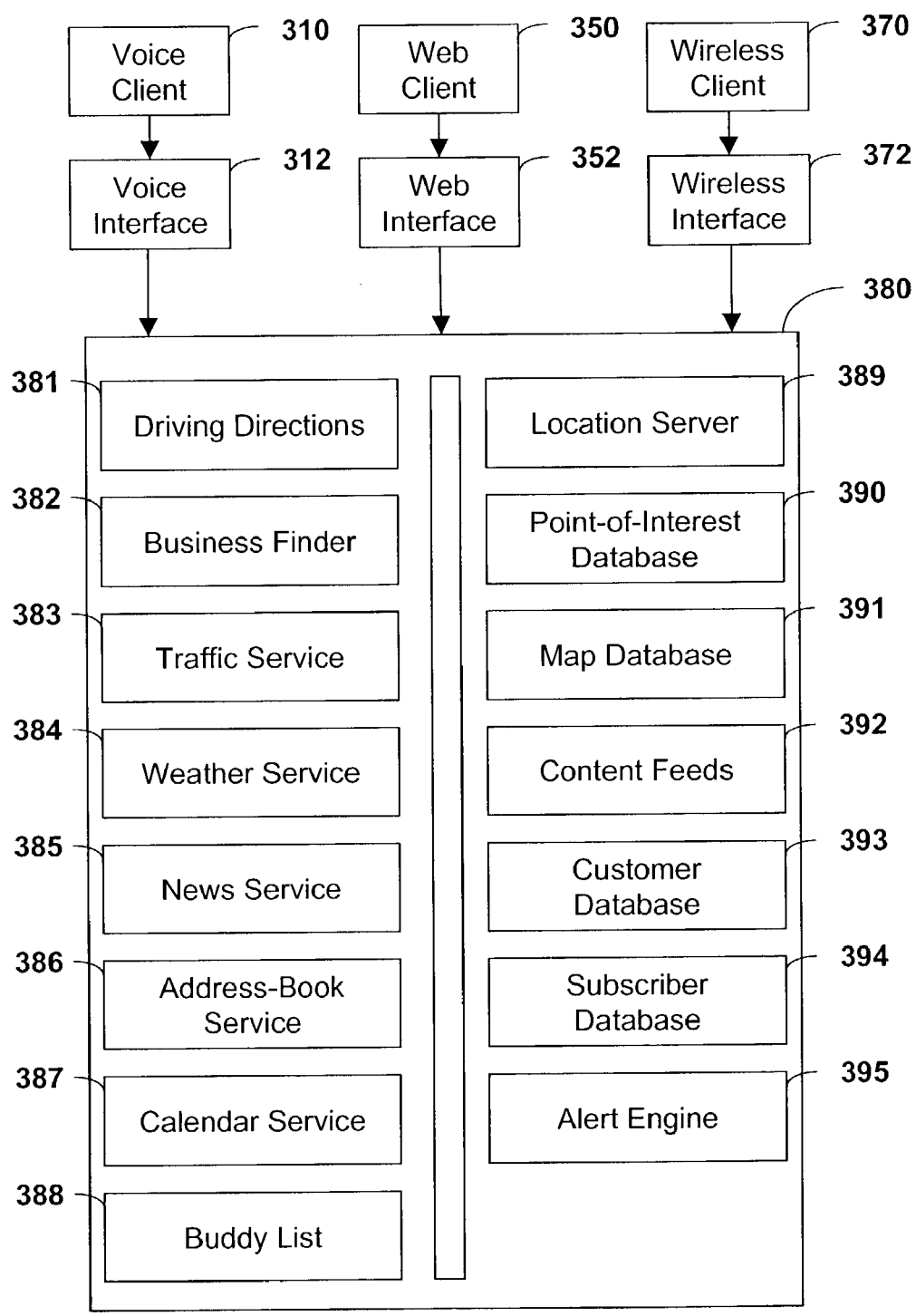
FIG. 3 schematically diagrams another embodiment of a system for providing location-based services to a mobile vehicle, in accordance with the current invention.

FIG. 3 is a schematic diagram of an embodiment of a system for providing location-based services to a mobile vehicle in accordance with the current invention. Location-based service system 300 involves the call center providing numerous location services based on messages with location-based attachments that are made available or sent to a vehicle from voice, web or wireless clients. A telematics unit or wireless device, such as a PDA, cell phone, or personal computer may use voice-recognition and speech-synthesis applications to help provide telematics subscriber services. Alternatively, these services may run in the call center to support access of the data on a server at a call center 380.

A voice client 310 in a mobile vehicle may send to call center 380 a message with attached location information through its telematics unit, which is equipped with a voice interface 312 that may include voice recognition, speech; synthesis, or concatenated speech. A web client 350, who is a driver or another subscriber of a telematics service, may use an Internet-enabled personal or user computer to compose and send a message through a web interface 352 of a website associated with call center 380. A wireless client 370, employing a cellular phone or a wireless handheld device such as a personal digital assistant or small computer, may create and send a message through the wireless interface 372 of a keypad, touch screen or other input mechanism.

Whether the message originates from a voice, web, or wireless client, a message with attached location-based information may be processed at call center 380 in a similar manner. The content of the message may include a calendar appointment, a calendar entry, a contact entry, an e-mail message, a news story or some type of alert.

For example, a calendar entry or calendar appointment with attached location information might be sent to a vehicle to remind a driver of a business appointment. After receiving the message, the driver speaks a voice command to the telematics unit, requesting driving directions 381 to the place of the appointment indicated by the message attachment. A location-based service can be provided based on the GPS coordinates of the current location of the mobile vehicle and the attached location information of the message. In this exemplary embodiment, driving directions, as well as the other location-based services are provided by call center 380. However, some of the location calculations and services may not require interaction with the call center, depending on the type of service, as well as the configuration and computing power of the telematics unit.

Besides driving directions 381, the call center may provide a business finder 382; a traffic service 383 with nationwide traffic reports, road conditions, accident updates and street routing; a weather service 384 with forecasts based on, for example, the current location of a telematics service subscriber, an entry of city and state, attached location information, a calendar entry, or a news story; a news service 385; an address-book service 386; a calendar service 387; a buddy list 388; and other location-based services. For example, buddy list 388 contains names of family, friends, and business associates with whom a driver wishes to share his or her current or intended location frequently.

The management of location information and service data requires the interaction of various software and hardware components at the call center, such as a location server 389 with geo-coding, reverse geo-coding and routing, a point-of-interest database 390, a map database 391, content feeds 392 for current news and entertainment programming, a customer database 393, a telematics subscriber database 394, and an alert engine 395 for sending messages to mobile vehicles. The location information may be a geo-coded point, a latitude and longitude coordinate pair, a street address, a street intersection, or a unique point-of-interest identifier that is a unique key in point-of-interest database 390.

FIG. 4 is a flow diagram of one embodiment of a method for providing location-based services to a mobile vehicle, in accordance with the current invention. Location-based service method 400 begins by a user generating a message to send to a mobile vehicle, as seen at block 405. For example, the user may speak one or more keywords as a command to a voice-enabled telematics unit, a computer, cellular phone or other handheld device. Alternatively, the voice-recognition application may suggest keywords relating to various message options. The digitized voice signal of the command indicates to the aforementioned devices that a message is to be created, including a content item such an alert, a calendar appointment, a calendar entry, a contact entry, an e-mail message, or a news story. The message may be generated by digitizing a voice signal. Keywords within the message may indicate that location information is to be attached. To that message, the user may select and attach location information to the message. An application server may automatically attach the location information. The format of the location information may depend on the service used, the network capabilities, plan features, user profile information, user preferences, or other suitable criteria. The location information may include a geo-coded point, a pair of global positioning system coordinates, a street address, a street intersection, a point-of-interest entry, a point-of-interest identifier, a business name, or any combination thereof.

An alternative way of generating the message is to invoke a web-based application accessed by a computer, handheld device or any Internet-enabled device to create the message at the web site of a telematics service call center. Location attachments can be generated automatically by a device or input manually by a user. Regardless of how it is generated, the message with the attached location information may be sent to the call center. Alternatively, the call center may also attach the location information to the message.

The call center may receive an initiation signal from a telematics unit in the mobile vehicle, as seen at block 410. The initiation signal may be a voice response to a prompt provided to the driver of the mobile vehicle that messages may be checked. The initiation signal may be received at the telematics unit and used to initiate the connection between the call center and the mobile vehicle.

Messages corresponding to the telematics unit of a mobile may or may not exist or be available, as seen at block 415. When there are no messages, the telematics unit waits for another initiation signal, as seen at block 420, until the process of initiation begins again, as seen back at block 410.

The call center sends a message notice based on a determination whether there is a message corresponding to the telematics unit, as seen at block 425. A prompt may be given to the user of the mobile vehicle indicating that messages are available. A voice prompt may be given to the user. In response, the user may request that messages be delivered and the mobile vehicle may send a request to download messages from the call center. The request for messages may include a voice response from the user.

The telematics unit in the mobile vehicle determines whether a message includes a location information attachment, as seen block 430. The call center or application server may determine whether a message contains location information and may respond accordingly when the driver connects to a real or virtual advisor. When a message has attached location information, the call center may provide one or telematics services based on the location information associated with the message, as seen at block 435. The location-based telematics service may include driving directions, a map service, a business finder, traffic information, road condition information, accident updates, weather information, a news service, an address book service, a calendar service, a buddy list service, point of interest information, a message forwarding service, a call connection service, or any combination of services thereof.

When location information is not attached to a message, the telematics unit and call center may proceed in providing any of a variety of telematics services that are not based on any attached location information, as seen at block 440.

More than one message may or may not be sent, as seen at block 445. When there is more than one message, the telematics unit presents the next message, determines whether there is location information attached, and provides the telematics services, as seen back at blocks 430, 435, and 440. When there are no more messages, the telematics unit may wait for another initiation message from the call center, as seen back at block 420.

FIG. 5 is a flow diagram of one embodiment of a method for providing location-based services between two mobile vehicles, in accordance with the present invention. Location-based service method 500 illustrates the primary steps in a method for sending a message with a location-based attachment from one driver to another. The first driver initiates a request for a location-based business-finder service from a call center, as seen at block 505. The call center provides a list of businesses that meet the location or other criteria that is input by the driver via a voice, button, touch-screen or other type of telematics-unit interface.

The driver chooses a point-of-interest location, as seen in block 510 and then via the call center, sends to a second driver a message with the point-of-interest location information attached, as seen at block 515. The recipient may be selected by name from a network-based directory service, a personal buddy list, or an address book.

The call center receives the message from the first driver, identifies the intended message recipient as seen at block 520, and records or stores the message with location information attached in a database, as seen at block 525. The database may map the name, addresses, services preferences, and vehicle that identify each telematics subscriber. After identifying the mobile vehicle of the intended recipient, the call center may send the message with location-based attachment to the second driver, as seen at block 530.

The second driver receives the message, as seen at block 535, and invokes a location-based service that employs location information from the message attachment as well as GPS data from the telematics unit in the mobile vehicle of the message recipient, as seen at block 540.

Figure 6A:
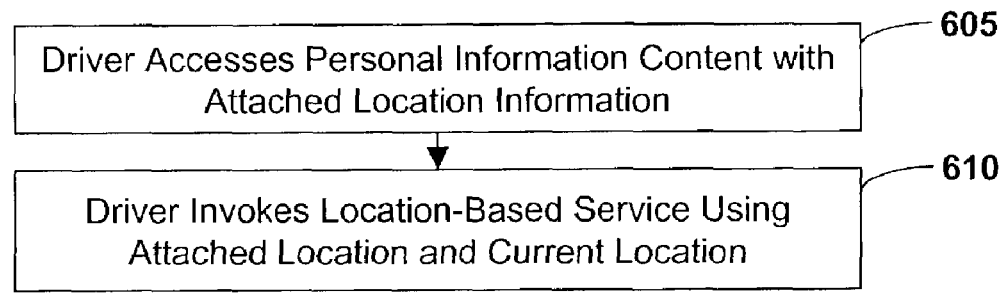
FIGS. 6a and 6b illustrate other embodiments of a method for providing location-based services, in accordance with the current invention.
Figure 6B:
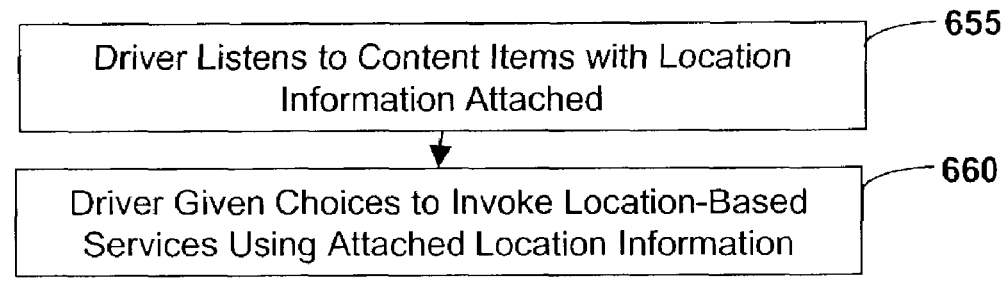

FIGS. 6a and 6b illustrate other embodiments of a method for providing location-based services, in accordance with the current invention. Location-based service method 600 provides a method whereby a driver accesses personal information content with attached location information, as seen at block 605.

The personal information content and attached location information is made available to the network side of the telematics system in a variety of ways, ranging from synchronization to direct access. Some or all of the personal information may be synchronized to a network repository from a desktop calendaring system or synchronized from a handheld device with personal information manager (PIM) software. The calendar information may also be directly accessed through a corporate firewall, or another Internet service. The driver may invoke a location-based service that uses the location information associated with a calendar event attached location and the current location of the vehicle, as seen at block 610.

For example, the driver gives a voice command to check his or her personal calendar. The virtual advisor of the call center indicates that there are two appointments for the day. The driver may indicate which appointment the advisor should read or the advisor may read both. One appointment is a meeting and the appointment has an attachment with the meeting location. The driver sends a command for driving directions and then the virtual advisor gives the address of the meeting location and the driving directions from the current location of the vehicle to the location of the meeting.

When the content item, such as a business appointment in a calendar, includes information related to a possible location such as a company name or address, the location-based system of the call center might be able to infer the location of the meeting, particularly if it represents a message in extensible markup language (XML) or another type of tagged data schema.

Location-based service method 650 illustrates a method whereby a driver listens to one or more content items such as a news story, concert review or general service content that have location information attached, as seen at block 655. Location information may be attached to an item in the content feed from the telematics service provider. After each item is presented, the driver is given a choice to invoke a location-based service that is based on attached location information, as seen at block 660.

For example, a driver gives a command to check local entertainment news. The virtual advisor gives a list of major entertainment events for the local area and then the driver commands the virtual advisor to give more detailed information on one of the events. After the details have been given, the advisor indicates that there is location information attached and asks if the driver wants to hear details about the location. The drivers answers affirmatively and the advisor gives the address as well as the driving directions to the driver. The advisor may ask if the driver wants to place a reservation. When the driver answers affirmatively, the telematics unit can automatically place a call to the phone number given in the message or provide a call connection. The driver may also be given the option to send or forward a message to another driver. The driver gives a message command to the virtual advisor and with the name of the intended recipient. The call center processes the message request and sends the message to the second driver.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of providing location-based services to a telematics service subscriber, comprising:
   sending a message notice to the telematics service subscriber;
   receiving a request for messages;
   determining whether at least one message includes a location information attachment; and
   providing at least one telematics service based on the determination.

2. The method of claim 1 wherein the message notice comprises a voice prompt.

3. The method of claim 1 wherein the request for messages comprises a voice response.

4. The method of claim 1 wherein the message with the attached location information comprises a content item.

5. The method of claim 4 wherein the content item is selected from the group consisting of an alert, a calendar appointment, a calendar entry, a contact entry, an e-mail message, and a news story.

6. The method of claim 1 wherein the location information attachment comprises information selected from the group consisting of a geo-coded point, a pair of global positioning system coordinates, a sweet address, a street intersection, a point-of-interest entry, a point-of-interest identifier, and a business name.

7. The method of claim 1 wherein the telematics service is selected from the group consisting of driving directions, a map service, a business finder, traffic information, road condition information, accident updates, weather information, a news service, an address book service, a calendar service, a buddy list service, point of interest information, a message forwarding service, and a call connection service.

8. The method of claim 1 further comprising:
receiving an initiation signal from the telematics service subscriber;
determining whether messages corresponding to the telematics service subscriber exist; and
sending the message notice based on the determination.

9. The method of claim 1 further comprising:
generating the message;
selecting location information to send as an attachment; and
sending the message with the attached location information to a call center.

10. The method of claim 9 wherein the message generation comprises digitizing a voice signal.

11. The method of claim 9 wherein the message generation comprises digitizing the voice signal following at least one keyword.

12. The method of claim 9 wherein the message generation comprises invoicing a web-based application.

13. The method of claim 1 wherein the request for messages is received at a call center, and wherein the messages are stored at the call center.

14. The method of claim 1 wherein the message is sent from one mobile vehicle to a second mobile vehicle, wherein the message is received at the call center from the one mobile vehicle and sent to the second mobile vehicle by the call center.

15. A computer usable medium including a program to providing location-based services to a telematics service subscriber, comprising:
computer program code to send a message notice to the telematics service subscriber;
computer program code to receive a request for messages;
computer program code to determine whether at least one message includes a location information attachment; and
computer program code to provide at least one telematics service based on the determination.

16. The computer usable medium of claim 15 further comprising:
computer program code to receive an initiation signal from the telematics service subscriber;
computer program code to determine whether messages corresponding to the telematics service subscriber exist; and
computer program code to send the message notice based on the determination.

17. The computer usable medium of claim 15 further comprising:
computer program code to generate the message;
computer program code to select location information to send as an attachment; and
computer program code to send the message with the attached location information to a call center.

18. A system for providing location-based services to a telematics service subscriber, comprising:
means for sending a message notice to the telematics service subscriber;
means for receiving a request for messages;
means for determining whether at least one message includes a location information attachment; and
means for providing at least one telematics service based on the determination.

19. The system of claim 18 further comprising:
means for receiving an initiation signal from the telematics service subscriber;
means for determining whether messages corresponding to the telematics unit exist; and
means for sending the message notice based on the determination.

20. The system of claim 18 further comprising:
means for generating the message;
means for selecting location information to send as an attachment; and
means for sending the message with the attached location information to a call center.

* * * * *